United States Patent
Tezuka et al.

(10) Patent No.: US 6,508,004 B2
(45) Date of Patent: Jan. 21, 2003

(54) SAFETY COVER FOR CUTTING BLADE OF PORTABLE TRIMMER

(75) Inventors: Fuminori Tezuka, Saitama-Ken (JP); Hisato Ohsawa, Tokyo (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 09/863,397

(22) Filed: May 24, 2001

(65) Prior Publication Data

US 2001/0045017 A1 Nov. 29, 2001

(30) Foreign Application Priority Data

May 24, 2000 (JP) ........................................ 2000-152802

(51) Int. Cl.⁷ ............................................... B26B 29/00
(52) U.S. Cl. .......................................... 30/276; 30/286
(58) Field of Search ........................... 30/276, 286, 347; 56/12.7

(56) References Cited

U.S. PATENT DOCUMENTS

| 4,651,422 A | * | 3/1987 | Everts | 30/347 |
| 4,864,728 A | | 9/1989 | Kloft et al. | |
| 5,423,126 A | * | 6/1995 | Byrne | 30/276 |
| 5,493,784 A | | 2/1996 | Aiyama | |
| 5,924,205 A | * | 7/1999 | Sugihara et al. | 30/276 |

* cited by examiner

Primary Examiner—Hwei-Siu C. Payer
(74) Attorney, Agent, or Firm—Nixon Peabody LLP; Donald R. Studebaker (57) ABSTRACT

A cutting blade safety cover for covering a rear portion of a cutting blade of a portable trimmer. The safety cover includes a roof plate portion and a skirt portion suspended from the roof plate portion. The roof plate portion is separated at a radially middle location thereof into a radially inner portion and a radially outer portion. The radially inner portion and the radially outer portion are detachably attached to each other so that the radially outer portion is replaceable with another radially outer portion having a dimension suitable for covering a cutting blade of a different dimension.

6 Claims, 8 Drawing Sheets

SAFETY COVER FOR CUTTING BLADE OF PORTABLE TRIMMER

BACKGROUND OF THE INVENTION

The present invention relates to a portable trimmer for cutting weeds or the like, and, in particular, to a safety cover for a cutting blade of a portable trimmer.

DESCRIPTION OF THE PRIOR ART

Portable trimmers for cutting weeds or the like have been known. A conventional and typical portable trimmer includes an engine, for example, a compact air-cooled type two-stroke cycle internal combustion engine, a supporting tube which has a power transmitting shaft inserted therein and extending straight from the engine in a forward direction, and a cutting blade which is mounted on the supporting tube at a front end thereof and is rotatably driven by the engine. A safety cover for covering a rear side of the cutting blade (an operator side) is mounted on such a type of portable trimmer at the front end of the supporting tube in accordance with the safety standard for preventing the operator from being wounded by a stone or the like scattered by the rotating blade. The safety cover for covering the cutting blade (hereafter, the "cutting blade safety cover") generally comprises a roof plate portion extending radially outward along and above a rotational plane of the cutting blade, and a skirt portion extending downward from an outer circumferential edge of the roof plate portion to the rotational plane.

There are several kinds of cutting blades, for example, a metal disc-type cutting blade with a plurality of cutting edges formed on a circumference thereof, and a nylon cord. The disc-type cutting blade and the nylon cord are different from each other in the radius of a rotational plane thereof. In case of the disc-type cutting blade, there are various types of cutting blades of different radii. Further, since the disc-type cutting blade and the nylon cord are different in the structure for mounting them to the front end of the supporting tube. They are also different in the vertical distance between a mounting position of the safety cover with respect to the supporting tube and the rotational plane of the cutting blade.

The cutting blade safety cover with optimal dimensions may preferably be selected in response to the type or size of the cutting blade since grass or the like is likely to be caught between an edge of the cutting blade and an inner circumference of the skirt portion when there is an excessively wide clearance therebetween and it is impossible to cut the grass short when the skirt portion for covering the cutting blade is too long. Therefore, when the cutting blade is replaced, the cutting blade safety cover must also be replaced with one having a dimension suitable thereto.

Conventionally, there has been a cutting blade safety cover devised so as to be capable of corresponding to various cutting blades. For example, U.S. Pat. No. 4,864,728 discloses a cutting blade safety cover suitable for various cutting blades having different mounting heights. This cutting blade safety cover has a flexible structure in which the vertical length of the skirt portion can be varied corresponding to a varied height position of a cutting blade mounted thereto. The cutting blade safety cover is structured to be divided circumferentially along a middle portion of the skirt portion in the vertical direction thereof so that the length of the skirt portion can be varied by allowing the skirt portion to be mounted to the roof plate portion with two different height positions.

In a conventional cutting blade safety cover described above, although the length of the skirt portion can be varied, an entire cutting blade safety cover must be replaced when a cutting blade of a different radius is employed.

Further, since generally being made by plastic injection molding, the cutting blade safety cover is preferably shaped to be easily released from the molding dies.

Accordingly, at least one advantage of the present invention is to provide a cutting blade safety cover that can be easily replaced by suitable one with optimal shape in response to the kind of the cutting blade.

A further advantage of the present invention is to provide a cutting blade safety cover that can be easily injection-molded.

SUMMARY OF THE INVENTION

The initial advantage of the present invention described above can be achieved by a cutting blade safety cover for covering a rear portion of a cutting blade of a portable trimmer, the safety cover comprising, a roof plate portion and a skirt portion suspended there from the roof plate portion, the roof plate portion being separated at a radially middle location thereof into a radially inner portion and a radially outer portion, the radially inner portion and the radially outer portion being detachably attached to each other so that the radially outer portion is replaceable with another radially outer portion having a dimension suitable for covering a cutting blade of a different dimension.

According to the present invention, the cutting blade safety cover is separated at a radially middle location of the roof plate portion of the cutting blade safety cover so that the radially outer portion of the cutting blade safety cover is detachable from the radially inner portion. Various types of radially outer portions having various radial dimensions and various vertical dimensions of the skirt portions corresponding to various cutting blades are prepared in advance. A replacing operation of the cutting blade can be easily carried out since only the radially outer portion needs to be replaced with a new one having a suitable size.

DESCRIPTION OF THE PREFERRED EMBODIMENTS OF THE PRESENT INVENTION

Referring to the several figures, various preferred embodiments of a cutting blade safety cover of a portable trimmer according to the present invention will be described below.

Figure 1:
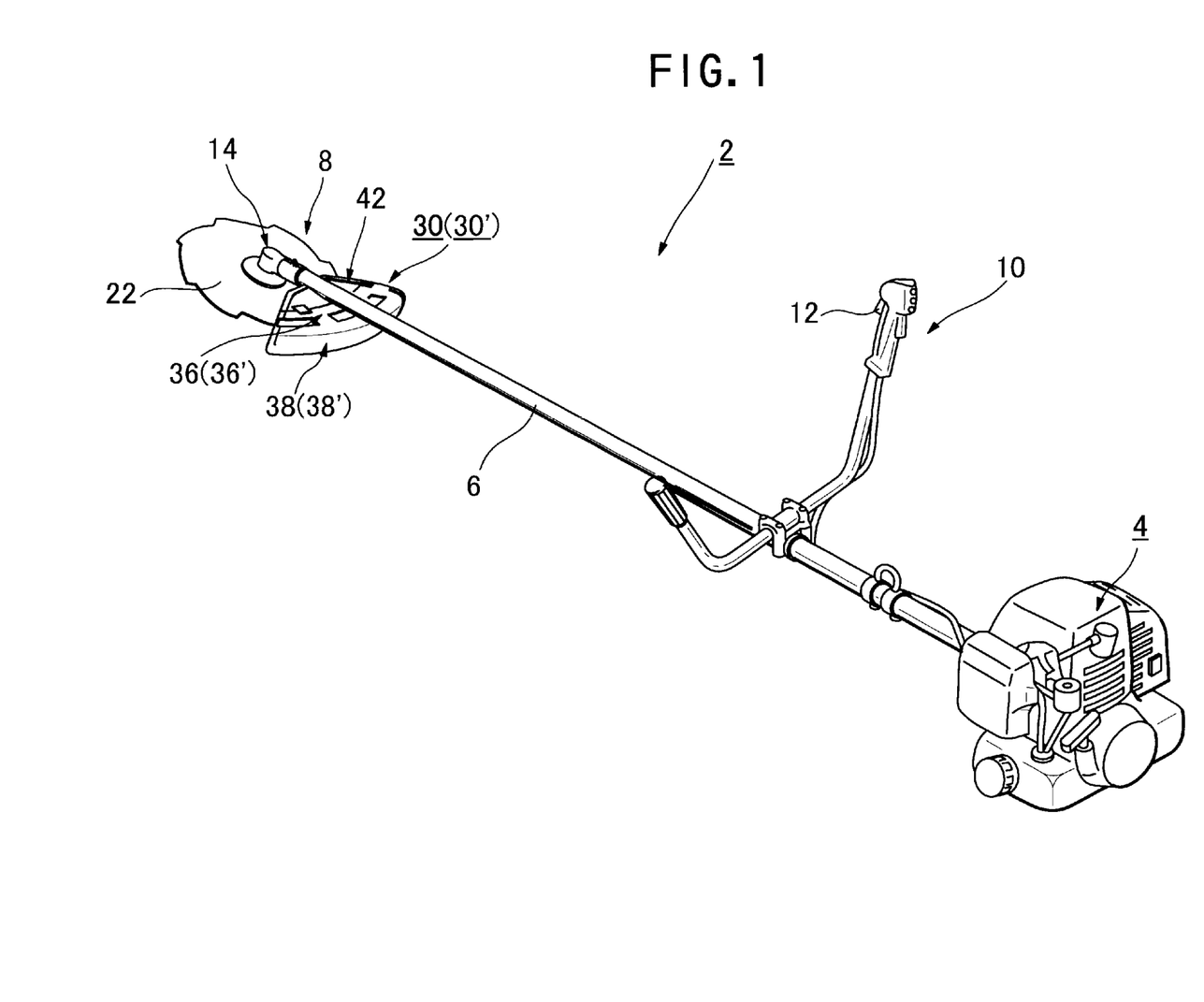
FIG. 1 is an overall perspective view illustrating an embodiment of a portable trimmer according to the present invention.
Figure 2:
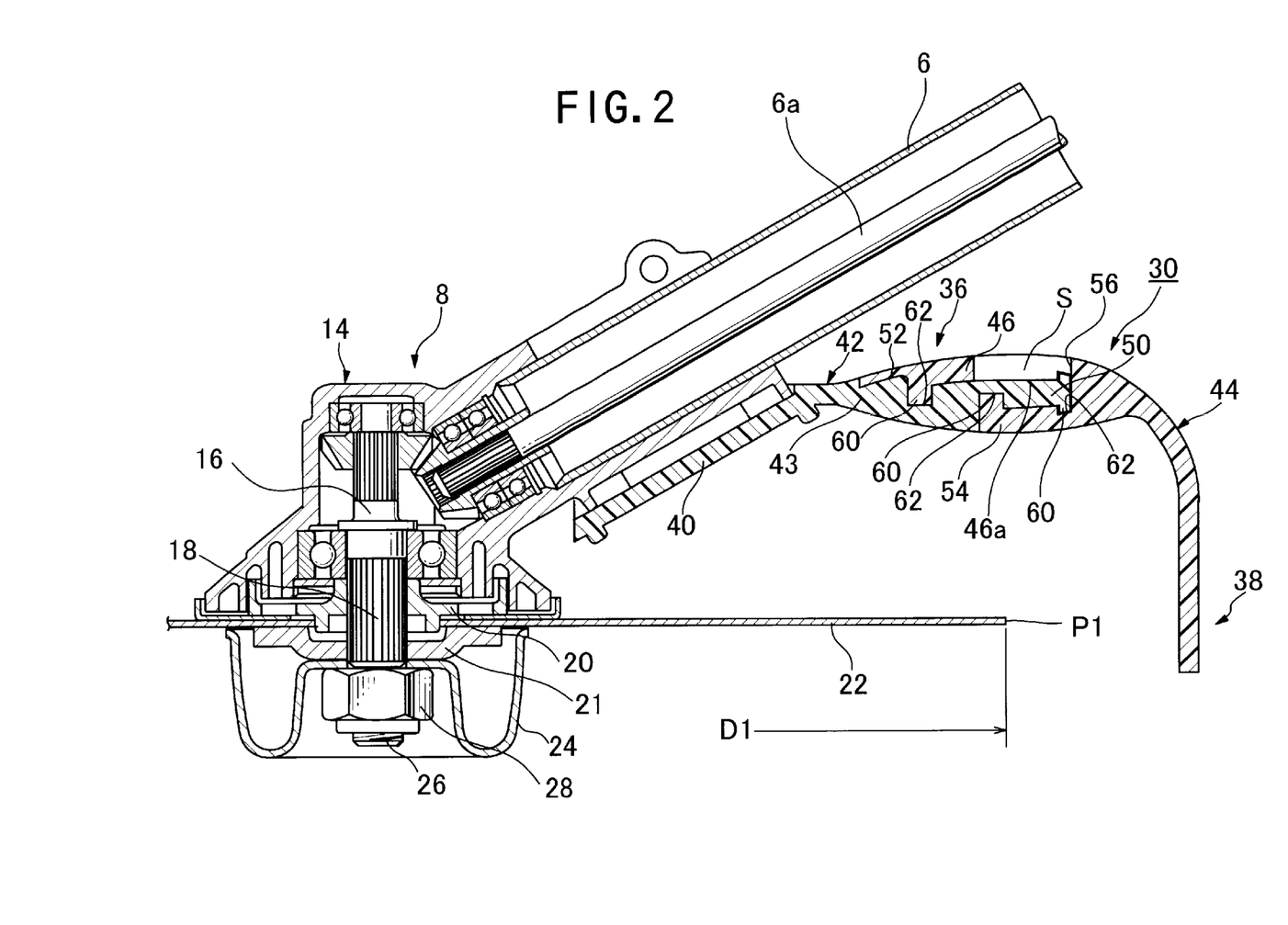
FIG. 2 is an enlarged longitudinal cross-sectional view of a cutting blade device portion of the portable trimmer with a disc-type cutting blade installed therein.

As shown in FIGS. 1 and 2, the portable trimmer 2 includes a compact air-cooled type two-stroke cycle internal combustion engine 4 as a driving means, a supporting tube 6 which has a power transmitting shaft 6a inserted therein, the transmission shaft 6a being operatively engaged with the engine 4 so as to be driven thereby and extending straight forward from the engine 4, a cutting blade device 8 mounted to a front end of the supporting tube 6, a handle portion 10 provided at a middle portion of the supporting tube 6, and an operating lever 12 provided at the handle portion 10 for controlling an output of the engine 4. The cutting blade device 8, as shown in FIG. 2, includes a bevel gear box 14 provided at a front end of the transmission shaft 6a, and a rotary shaft 16 (cutting blade mounting shaft) rotatably driven via the bevel gear box 14. The rotary shaft 16 has a spline portion 18 formed on a lower portion thereof and a cutting blade mounting block 20 is installed on the shaft 16 by inserting the spline portion 18 into the mounting block 20 from an upper side thereof so as to drive it together integrally. A disc-type cutting blade 22 or other known cutting blade is installed on the rotary shaft 16 on an under side of the cutting blade mounting block 20 and, further, a retaining block 21 for holding down the disc-type cutting blade 22 against the cutting blade mounting block 20 and a protection cover 24 for preventing the lower end of the rotary shaft 16 from touching the ground are installed on the under side of the cutting blade 22 in this order. These four components are fixed to the rotary shaft 16 by turning a locking nut 28 so as to be tightly engaged with a male threaded portion 26 formed on a lower end portion of the rotary shaft 16. Further, a cutting blade safety cover 30 is provided at the front end of the supporting tube 6 so as to cover a rear portion of the disc-type cutting blade 22 (on the operator side) for preventing stones or cut weeds from being scattered toward an operator.

Figure 3:
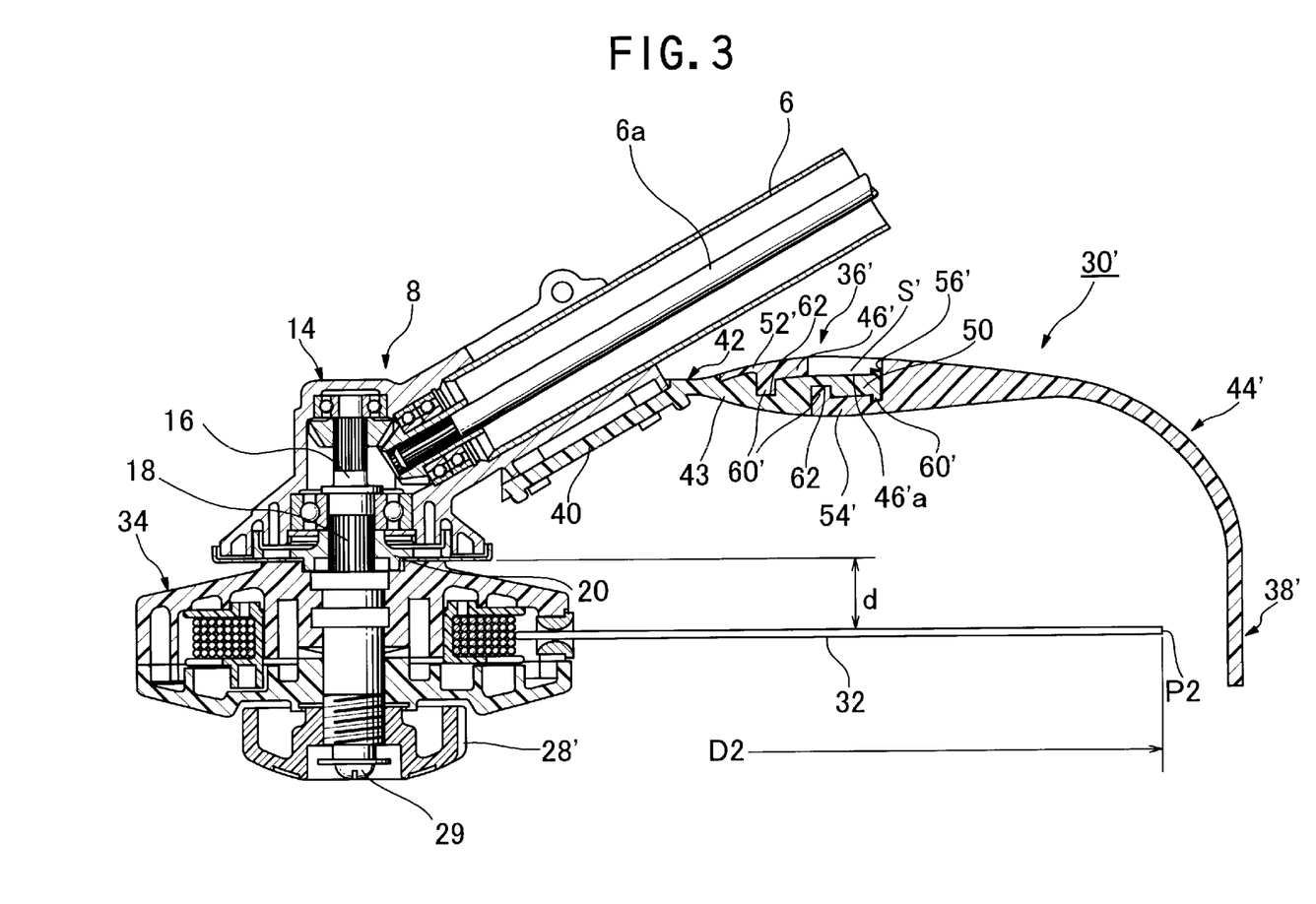
FIG. 3 is an enlarged longitudinal cross-sectional view of a cutting blade device portion of the portable trimmer with a nylon cord installed therein.

FIG. 3 is similar to FIG. 2, wherein the disc-type cutting blade 22 of the portable trimmer 2 of FIG. 2 is substituted for by a nylon cord 32 as the cutting blade. When the disc-type cutting blade 22 is to be replaced by the nylon cord 32, the protection cover 24 and the locking nut 28 shown in FIG. 2 are removed and then the disc-type cutting blade 22 is removed. A reel housing 34 with the nylon cord 32 wound therein is installed onto the rotary shaft 16 from an under side thereof and is fixed to the rotary shaft 16 by a knob-type nut 28' and a slip-off prevention screw 29. Regarding the nylon cord 32, a spare cord is wound inside the reel housing 34. Since the nylon cord 32 is likely to be worn out or snapped off in use, the nylon cord 32 is adapted to be drawn out if it so happens. This is accomplished by allowing the nylon cord 32 to be pulled out of the reel housing 34 by hand after the knob-type nut 28' having been loosened.

As is apparent from a comparison of FIG. 2 and FIG. 3, while a rotational plane P1 of the disc-type cutting blade 22 shown in FIG. 2 is located at almost the same height as the cutting blade mounting block 20 since the disc-type cutting blade 22 is directly mounted on the cutting blade mounting block 20, in the case of the nylon cord 32 shown in FIG. 3, a rotational plane P2 of the nylon cord 32 is located at a predetermined distance "d" below the cutting blade mounting block 20 since the reel housing 34 having a certain thickness is mounted on the cutting blade mounting block 20. Further, the turning diameter D2 of the nylon cord 32 shown in FIG. 3 is greater than the turning diameter D1 of the disc-type cutting blade 22 shown in FIG. 2. Accordingly, the shape and the dimension of the cutting blade safety cover 30, 30' have to be changed in response to the variations in the mounting height and shape of the cutting blades 22 and 32 as shown in FIGS. 2 and 3.

As can be seen from FIG. 1, the cutting blade safety cover 30, 30' is generally fan-shaped in a plan view and has a roof plate portion 36, 36' extending radially outward along the rotational plane P1 of the disc-type cutting blade 22, and a skirt portion 38, 38' extending downward from an outer circumferential edge of the roof plate portions 36, 36'. An attaching portion 40 or an inner end portion of the roof plate portions 36, 36' is fixed to a front end of the supporting tube 6. As can be seen from FIG. 2 and FIG. 3, each of the cutting blade safety covers 30, 30' of the present invention is divided into two portions, i.e. a radially inner portion 42 and a radially outer portion 44 or 44', at a radially middle location of the roof plate portions 36, 36'. Each of the radially outer portions 44, 44' is made detachable from the radially inner portion 42, and such that the radially outer portions 44, 44' can be replaced with a suitable one corresponding to the kind of an installed cutting blade 22, 32.

Figure 4:
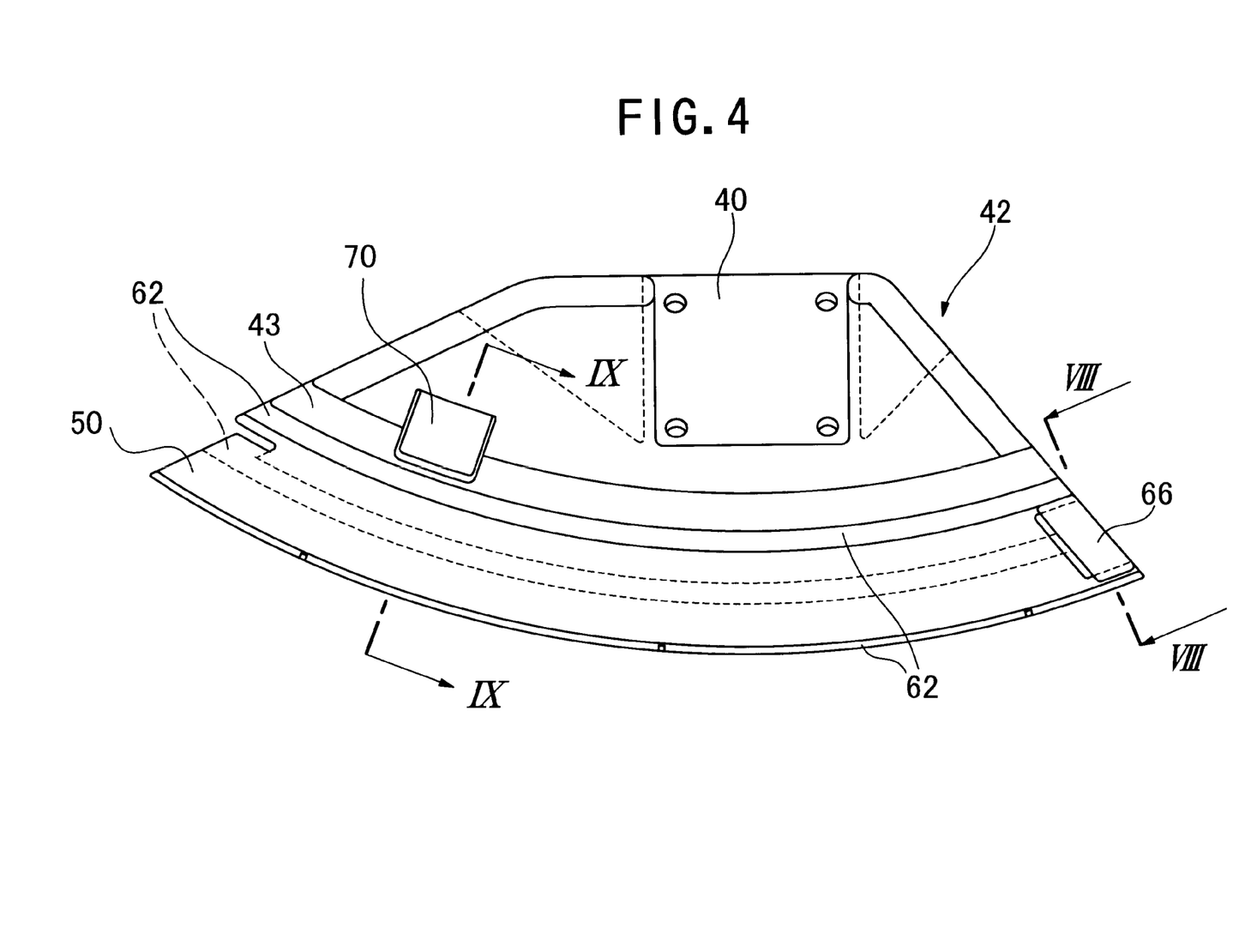
FIG. 4 is a plan view illustrating a radially inner portion of a cutting blade safety cover.

Referring to FIGS. 2, 3 as well as FIGS. 4 and 5, the shape of the radially inner portion 42 will be described. The radially inner portion 42 is generally fan-shaped in a plan view and has at an inner edge thereof the attaching portion 40 to be fixed to the front end portion of the supporting tube 6. The radially inner portion 42 has a roof plate inner portion 43 extending almost straight in a radially outward direction from the attaching portion 40 along the rotational plane P1, P2 of the cutting blade 22, 32. The radially outer portion 44 for the disc-type cutting blade 22 shown in FIGS. 2 and 5 comprises a roof plate outer portion 46 extending radially and almost straight along the rotational plane P1 of the disc-type cutting blade 22 and the skirt portion 38 extending downward from an outer circumferential edge thereof.

Figure 6:
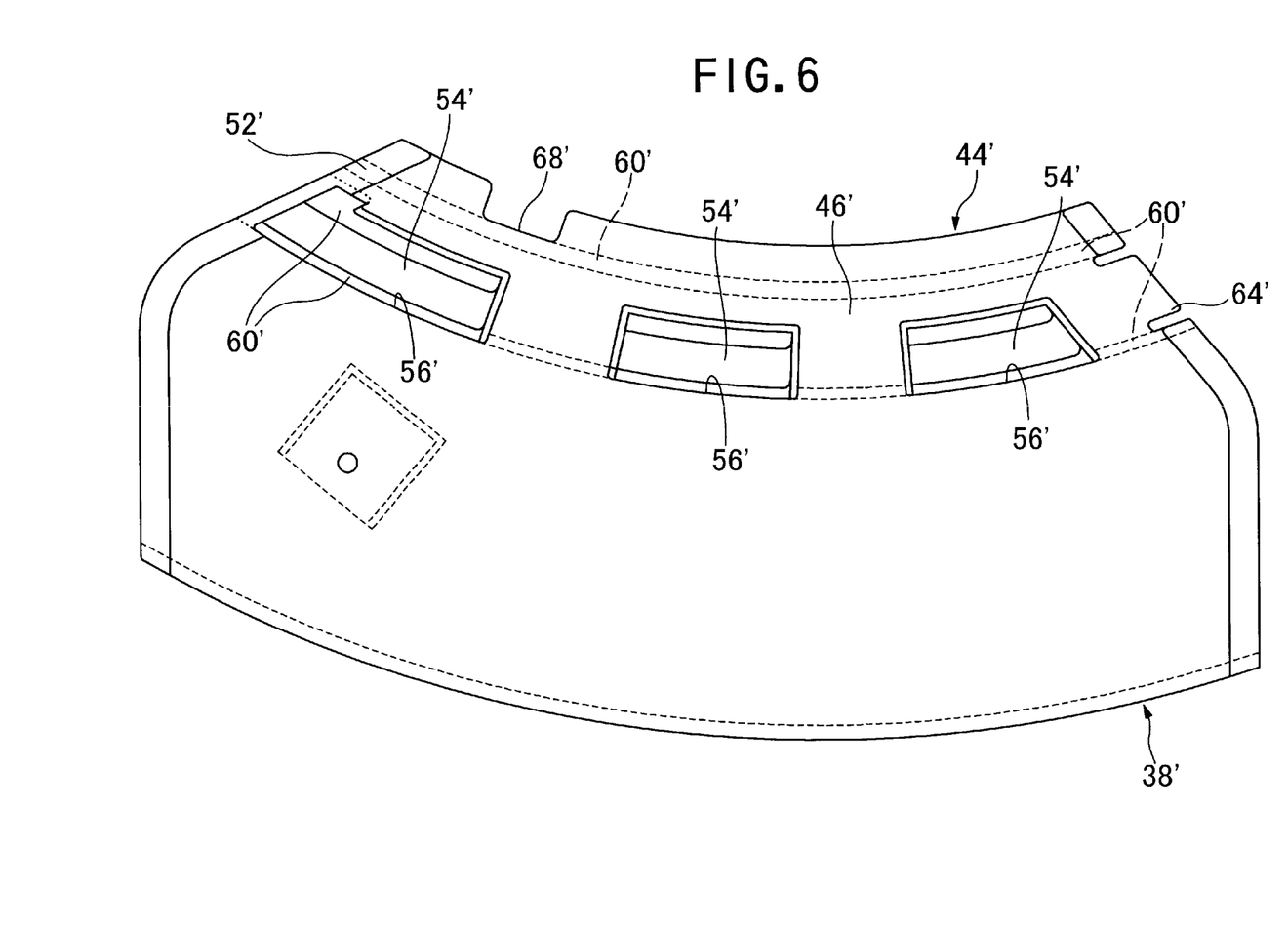
FIG. 6 is a plan view illustrating a radially outer portion of a cutting blade safety cover for a nylon cord.

Although the radially outer portion 44' for the nylon cord 32 shown in FIGS. 3 and 6 also comprises a roof plate outer portion 46' extending radially and almost straight along the rotational plane P2 of the nylon cord 32 and the skirt portion 38' extending downward from an outer circumferential edge thereof, the radially outer portion 44', when compared with the radially outer portion 44 for the disc-type cutting blade 22, differs therefrom in that the roof plate outer portion 46' is greater in its radial dimension and that the skirt portion 38' is longer in its length.

An outer circumferential edge portion 50 of the radially inner portion 42 and an inner circumferential edge portion 52, 52' of the radially outer portion 44, 44', as will be described later, are structured to be detachable from each other.

The radially inner portion 42 and the radially outer portion 44, 44' are integrally formed by plastic-injection molding respectively.

Figure 5:
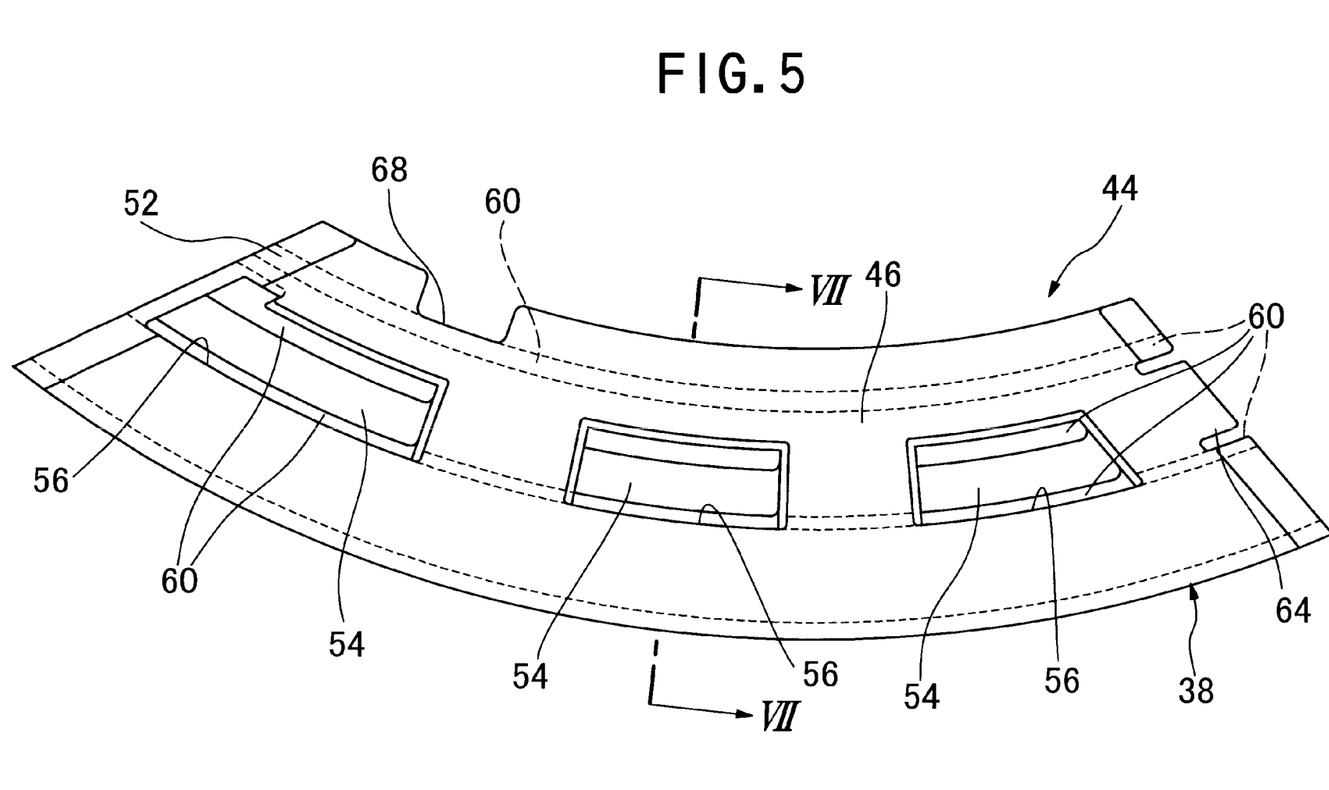
FIG. 5 is a plan view illustrating a radially outer portion of a cutting blade safety cover for a disc-type cutting blade.
Figure 7:
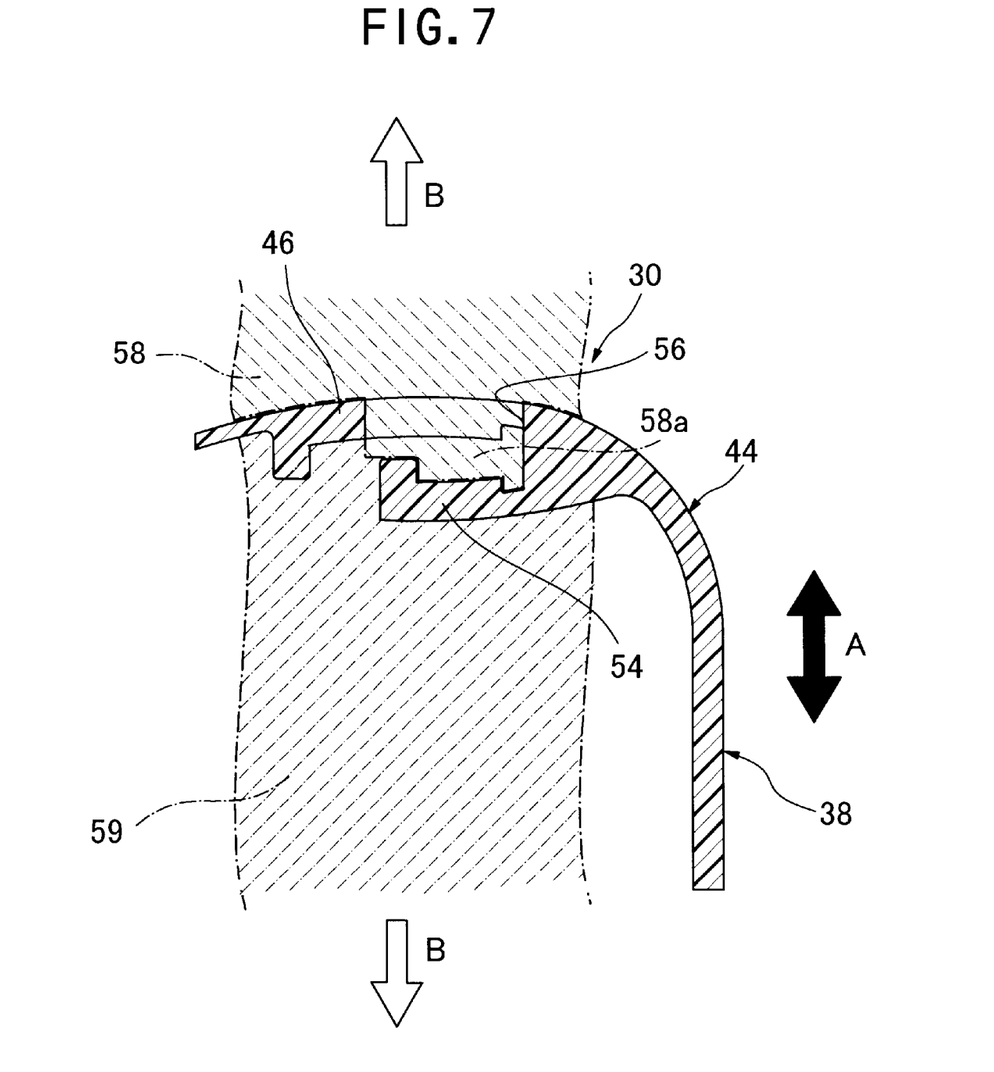
FIG. 7 is a cross-sectional view taken along lines VII—VII of FIG. 5, illustrating the radially outer portion for the disc-type cutting blade and a relationship between the radially outer portion of a cutting blade safety cover and a molding die for forming it, in which a portion of the molding die is shown by phantom lines.

As can be seen from FIGS. 2, 5 as well as FIGS. 3, 6, on a lower face 46a, 46'a of the roof plate outer portion 46, 46' of the radially outer portion 44 or 44', three shelf portions 54, 54' extending in the radially inward direction, namely, extending toward the radially inner portion 42, are formed along the circumference of the roof plate outer portion 46, 46'. Each shelf portion 54, 54' extends along the lower face 46a, 46a' of the roof plate outer portion 46, 46' and is spaced therefrom, such that a receiving area "S" is formed between the lower face 46a, 46a' and the shelf portion 54, 54' for receiving the outer circumferential edge portion 50 of the radially inner portion 42. Three window portions 56, 56' are formed on the roof plate outer portion 46, 46' adjacent to the shelf portions 54, 54' in the withdrawing direction of molding dies 58, 59 (FIG. 7). The window portion 56, 56' is defined to be slightly larger than the shelf portion 54, 54' in a plan view.

The radially outer portion 44, 44' is formed, for example, using the dies 58, 59 or an upper and a lower dies, and accordingly the dies 58, 59 are drawn in a direction along which the skirt portion 38, 38' extends (as indicated by a black arrow A in FIG. 7). To describe the radially outer portion 44 with reference to FIG. 7, since the window portion 56 is located adjacent to the shelf portion 54 in the withdrawing direction of the dies 58, 59, a die portion 58a for molding the shelf portion 54 can be designed so as to extend through the window portion 56. As shown in FIG. 7, the die portion 58a for molding the shelf portion 54 extends in the direction along which the skirt portion 38 extends, passing through the window portion 56 across a wall face of the radially outer portion 44, and is drawn in the direction indicated by white arrow B in FIG. 7.

Referring again to FIGS. 2 and 3, a first rib/groove portion 60, 60' is formed on the radially outer portion 44, 44' at the inner circumferential edge portion 52, 52' and also at the shelf portion 54, 54' thereof, so as to be directed in the die-withdrawing direction of the dies 58, 59 passing through the window portion 56, 56' when viewed in the radial cross-section. The first rib/groove portion 60, 60', as shown by dotted lines in FIGS. 5 and 6, extends over the whole shelf portions 54, 54' and over the whole circumference of the radially outer portion 44, 44'. Additionally, a second rib/groove portion 62 is formed on the outer circumferential edge portion 50 of the radially inner portion 42 so as to be complementarily and fittingly engaged with the first rib/groove portion 60, 60' formed on the inner circumferential edge portion 52, 52' and the shelf portion 54, 54' of the radially outer portion 44, 44'. The second rib/groove portion 62 is also arranged to be directed in the die-withdrawing direction of the dies 58, 59, and extends over the whole circumference of the radially inner portion 42, as shown by dotted lines in FIG. 4. The radially outer portion 44, 44' and the radially inner portion 42 come to be interconnected by inserting the outer circumferential edge portion 50 of the radially inner portion 42 into the receiving area S, S' formed between the lower face 46a, 46a' and the shelf portion 54, 54' of the radially outer portion 44, 44', from a side edge thereof. The first rib/groove portion 60, 60' and the second rib/groove portion 62 prevent the radially outer portion 44, 44' from slipping out of the radially inner portion 42.

Figure 8:
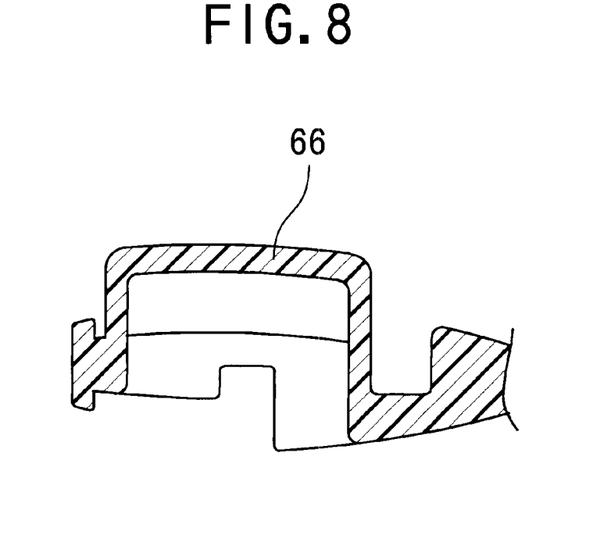
FIG. 8 is a cross-sectional view taken along lines VIII—VIII of FIG. 4, illustrating an arched receiving portion formed on a side edge portion of the radially inner portion.

Further, as shown in FIGS. 5 and 6, a tongue-like portion 64, 64' protruding in the circumferential direction is formed on one side edge portion of the radially outer portion 44, 44'. As shown in FIG. 8, the arched receiving portion 66 is formed on an upper face of the side edge portion of the radially inner portion 42 at a location corresponding to the tongue-like portion 64, 64' so that the arched receiving portion 66 may receive the tongue-like portion 64, 64' when the radially outer portion 44, 44' and the radially inner portion 42 are interconnected.

Figure 9:
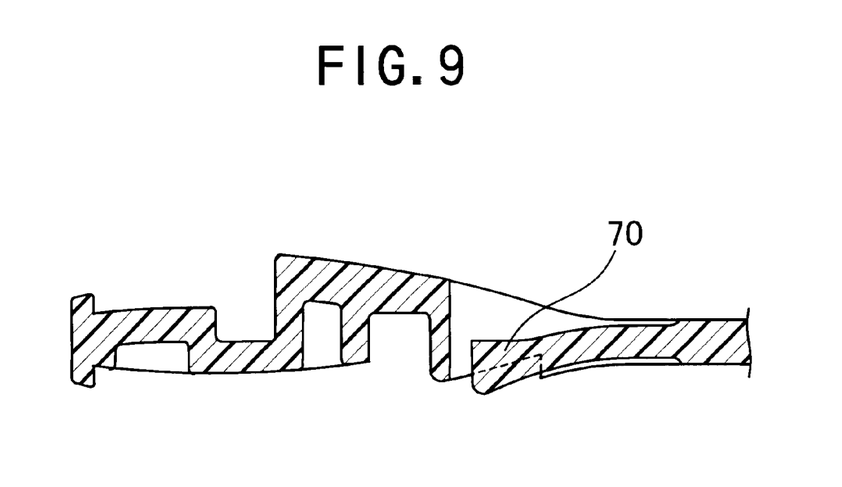
FIG. 9 is a cross-sectional view of the radially inner portion taken along lines IX—IX of FIG. 4.

Further, as can be seen from FIGS. 5 and 6, a notch 68, 68' is formed on an inner circumferential edge portion of the radially outer portion 44, 44' so as to be recessed therefrom in the radial direction when viewed in a plan view. Further, as shown in FIGS. 4 and 9, an elastic engaging piece 70 is formed on a middle portion of the radially inner portion 42 so that it may be engaged with the notch 68, 68' to hold the radially outer portion 44, 44' in the radial direction. The elastic engaging piece 70 is molded integrally with the radially inner portion 42 such that only an inner end thereof may be connected to a main body of the radially inner portion 42. When the radially outer portion 44, 44' is to be coupled with the radially inner portion 42, the elastic engaging piece 70 is pressed downward by a finger so that it is deflected outside a travel passage along which the radially outer portion 44, 44' would slide when it is slid in a circumferential direction along the radially inner portion 42. Since the notch 68, 68' and the elastic engaging piece 70 are configured to align with each other when the radially outer portion 44 and the radially inner portion 42 are interconnected, the elastic engaging piece 70 is received in the notch 68, 68' when the finger is drawn back.

According to the present embodiment, since the window portion 56, 56' is located adjacent to the shelf portion 54, 54' in the withdrawing direction of the dies 58, 59 or in the direction along which the skirt portion 38, 38' extends, a portion of the dies 58 for molding the shelf portion 54, 54' can be designed so as to extend through the window portion 56, 56'. This makes the die structure simple and thereby reducing the manufacturing cost since the molding die portion 58a for molding the shelf portion 54, 54' can be drawn through the window portion 56, 56' so long as the die 58 is drawn in the direction along which the skirt portion 38 extends.

Further, according to the present embodiment, since the first rib/groove portion 60, 60' and the second rib/groove portion 62 are formed respectively on the inner circumferential edge portion 52, 52' or the shelf portion 54, 54' of the radially outer portion 44, 44' for preventing the radially outer portion 44, 44' from slipping off in the radial direction and are directed in the direction along which the dies 58, 59 are drawn through the window portion 56, 56', the die structure can be made simple and consequently the manufacturing cost associated therewith can be reduced.

Furthermore, according to the present embodiment, since the tongue-like portion 64, 64' protruding in the circumferential direction is formed on one side edge portion of the radially outer portion 44, 44' and the arched receiving portion 66 for receiving the tongue-like portion 64, 64' is formed on an upper face of the side edge portion of the radially inner portion 42b at a location corresponding to the tongue-like portion 64, 64'. Therefore, the arched receiving portion 66 serves as a stopper when the radially outer portion 44, 44' is slid in the circumferential direction along the radially inner portion 42 to be connected therewith. The radially outer portion 44, 44' is also prevented from being lifted upward with respect to the radially inner portion 42 when a vertical force is applied to the skirt portion 38, 38'.

Furthermore, according to the present embodiment, since the notch 68, 68' recessed in the radial direction when viewed in a plan view is formed on the inner circumferential edge portion 52, 52' of the radially outer portion 44, 44', and the elastic engaging piece 70 is formed on the middle portion of the radially inner portion 42 so that it may be engaged with the notch 68, 68' to hold the radially outer portion 44, 44' with respect to the radial direction, the radially outer portion 44, 44' is held with respect to the radially inner portion 42 and whereby it is prevented from being slipping out in the circumferential direction.

The present invention has thus been shown and described with reference to specific embodiments. However, it should be noted that the present invention is in no way limited to the details of the described arrangements but changes and modifications may be made without departing from the scope of the appended claims.

For example, although, in the present embodiment, the shelf portion 54, 54' is provided on the radially outer portion 44, 44' and the outer circumferential edge portion 50 of the radially inner portion 42 is configured to be received between the lower face 46a, 46a' and the shelf portion 54, 54' of the radially outer portion 44, 44', the shelf portion 54 may be provided on the radially inner portion 42, and the inner circumferential edge portion 52 of the radially outer portion 44, 44' may be received between the shelf portion 54 and a main body of the radially inner portion 42. In this case, the window portion 56 may be provided on the radially inner portion 42 so as to be adjacent to the shelf portion 54.

Further, although, in the present embodiment, the shelf portion 54, 54' is provided below the inner circumferential edge portion 52 of the radially outer portion 44, it may be provided above the inner circumferential edge portion 52.

Further, although, in the present embodiment, the shelf portion 54, 54' is provided on the lower face side of the radially outer portion 44, 44', the shelf portion 54, 54' may be provided on the upper face side thereof.

Further, although, in the present embodiment, the three shelf portions 54, 54' are formed and the three window portions 56, 56' are formed adjacent thereto, the number of the shelf portions 54, 54' may be increased or the size thereof may be made larger by increasing the number of the window portions 56, 56' or making the size thereof larger so long as the strength of the wall portion of the radially outer portion 44, 44' can be maintained. On the other hand, the number of the shelf portions 54, 54' may be decreased or the size thereof may be made smaller so long as the connecting strength between the radially outer portion 44, 44' and the radially inner portion 42 can be maintained.

Further, the first rib/groove portion 60, 60' and the second rib/groove portion 62 may be changed in their number or shape so long as the direction thereof is directed in the die-withdrawing direction (the direction along which the skirt portion 38 extends).

Further, regarding the size of the radially outer portion 44, 44', a plurality of radially outer portions 44, 44' of various sizes can properly be prepared beforehand for a single radially inner portion 42 so as to accommodate with the specific size or mounting height of the cutting blade 22, 32.

What is claimed is:

1. A cutting blade safety cover for covering a rear portion of a cutting blade of a portable trimmer, said safety cover comprising:
    a roof plate portion radially separated at a middle location thereof into a radially inner portion and a radially outer portion;
    a skirt portion suspended from said roof plate portion;
    a shelf portion extending along at least one mating edge of said radially outer portion;
    a receiving area for receiving mating edge of said radially inner portion formed between the at least one mating edge and said shelf portion;
    a window formed in said radially outer portion adjacent to said shelf portion; and
    a protruding portion and a depressed portion formed on said shelf portion and said one mating edge for engaging with each other to prevent detachment of said radially inner portion and said radially outer portion from each other in the radial directions and said radially inner portion and said radially outer portion are connected with each other by inserting said one mating edge into said receiving area in a peripheral direction;
    wherein said radially inner portion and said radially outer portion are detachably attached to one another so that said radially outer portion is replaceable with another radially outer portion having a dimension suitable for covering a cutting blade of a different dimension.

2. A cutting blade safety cover for covering a rear portion of a cutting blade of a portable trimmer, said safety cover comprising:
    a roof plate portion radially separated at a middle location thereof into a radially inner portion and a radially outer portion;
    a skirt portion suspended from said roof plate portion;
    a shelf portion extending along at least one mating edge of said radially outer portion;
    a receiving area for receiving one mating edge of said radially inner portion formed between the other at least one mating edge and said shelf portion; and
    a window formed in said radially outer portion adjacent to said shelf portion;
    wherein said radially inner portion and said radially outer portion are detachably attached to one another so that said radially outer portion is replaceable with another radially outer portion having a dimension suitable for covering a cutting blade of a different dimension.

3. A cutting blade safety cover in accordance with claim 2, further comprising a protruded portion and a depressed portion for engaging with each other formed on said shelf portion and said one mating edge;
    wherein said protruded portion and said depressed portion engage with each other so as to prevent detachment of said radially inner portion and said radially outer portion from each other in the radial direction and said radially inner portion and said radially outer portion are connected with each other by inserting said one mating edge into said receiving area in a peripheral direction.

4. A cutting blade safety cover for covering a rear portion of a cutting blade of a portable trimmer, said safety cover comprising:
    a roof plate portion and a skirt portion suspended from said roof plate portion, said roof plate portion radially separated at a middle location thereof into a radially inner portion and a radially outer portion; wherein said radially inner portion and said radially outer portion are detachably attached to one another, so that said radially outer portion is replaceable with another radially outer portion having a dimension suitable for covering a cutting blade of a different dimension; and
    at least one window formed in said radially outer portion for detachably receiving said radially inner portion.

5. A cutting blade safety cover in accordance with claim 1, further comprising a shelf portion extending along at least one mating edge of said radially outer portion, a receiving area for receiving one mating edge of said radially inner portion is formed between the at least one mating edge and said shelf portion; and
    wherein said at least one window is formed in said radially outer portion adjacent to said shelf portion, said at least one window being formed in a molding die-withdrawing direction so as to permit withdrawal of a molding die portion for molding said shelf portion therethrough.

6. A cutting blade safety cover in accordance with claim 5, further comprising a protruded portion and a depressed portion for engaging with each other formed on said shelf portion and said one mating edge, wherein said protruded portion and said depressed portion engage with each other so as to prevent detachment of said radially inner portion and said radially outer portion from each other in the radial direction; and said radially inner portion and said radially outer portion are connected with each other by inserting said one mating edge into said receiving area in a peripheral direction, and said protruded portion and said depressed portion extend in said die-withdrawing direction.

* * * * *